United States Patent Office 2,815,337
Patented Dec. 3, 1957

2,815,337
COPPER-CONTAINING DISAZO DYESTUFFS

Fritz Kehrer, Basel, and Walter Wehrli, Riehen, near Basel, Switzerland, assignors, by mesne assignments, to Saul & Co., Newark, N. J., as nominee of Fidelity Union Trust Company, executive trustee under Sandoz Trust No Drawing. Application March 7, 1955, Serial No. 492,745

Claims priority, application Switzerland March 17, 1954

6 Claims. (Cl. 260—148)

It has been found that very valuable copper complex disazo dyestuffs are obtained when the symmetrical urea of 2-amino-5-hydroxynaphthalene-7-sulfonic acid is coupled in either order with a diazotized aminobenzene of the general formula

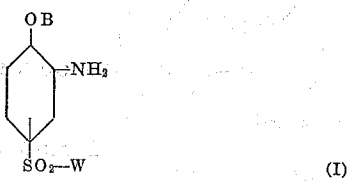

wherein B stands for hydrogen or methyl, and W stands for a lower aliphatic or carbocyclic hydrocarbon radical, and with the diazo compound of an amine of the general formula $$b\text{---}R\text{---}NH_2 \qquad (II)$$

wherein $b$ stands for a hydroxy, methoxy or carboxy group, and R stands for a radical of the benzene series in which the substituent $b$ is in ortho-position to the $NH_2$ group and which may be further substituted by the common water-solubilizing groups commonly used in the azo dyestuffs, the disazo dyestuff so formed being treated with a copper-yielding agent, either in substance or on the fiber.

Among the common water-solubilizing groups in the azo dyestuffs suitable as further substituents of the compound of general Formula II, the sulfonic acid group, the sulfonic acid amide group, the sulfonic acid amide group substituted on the nitrogen atom by alkyl or aryl, and the alkyl and arylsulfonyl groups merit special mention.

The dyestuffs are obtained by combining the monoazo compound formed from 1 mol of a diazotized aminobenzene (I) and 1 mol of the symmetrical urea of 2-amino-5-hydroxynaphthalene-7-sulfonic acid with 1 mol of a diazotized aminobenzene (II), or alternatively by preparing the monoazo compound from 1 mol of a diazotized aminobenzene (II) and 1 mol of the symmetrical urea of 2-amino-5-hydroxynaphthalene-7-sulfonic acid and coupling it with 1 mol of a diazotized aminobenzene (I). The resulting disazo dyestuffs are converted into the copper complex compounds in substance or on the fiber. Coupling is carried out preferably in a weakly alkaline medium. In cases where the uncoppered dyestuff contains a methoxy group in ortho-position to the azo bridges, the method of converting employed must produce simultaneous splitting of the methoxy group.

The new disazo dyestuffs in their unmetallized form correspond to the general formula

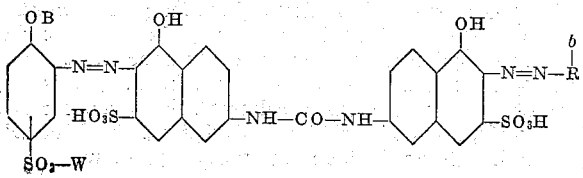

wherein B, W, R and $b$ have the above-mentioned significance.

The copper complex disazo dyestuffs are readily soluble and possess very high affinity for cotton and fibers of regenerated cellulose which they dye in bright Bordeaux shades of very good fastness to light.

The following examples illustrate the invention without limiting its scope. All parts are by weight; temperatures are given in degrees centigrade.

Example 1

18.8 parts of 1-amino-2-hydroxybenzene-5-sulfonic acid amide are stirred into 800 parts of water and 23 parts of concentrated hydrochloric acid. When the suspension has cooled to 0–5°, 6.9 parts of sodium nitrite are added. The diazo suspension thus formed is run into a solution of 54.8 parts of the symmetrical urea of 2-amino-5-hydroxynaphthalene-7-sodium sulfonate, 16.8 parts of sodium bicarbonate and 1300 parts of water. On formation of the monoazo compound, 26.5 parts of anhydrous sodium carbonate are added to the reaction product, followed by the diazo suspension of 18.7 parts of 1-amino-2-hydroxy-5-methylsulfonylbenzene. The fine disperse disazo dyestuff thus obtained is brought into solution at 80–85° by the addition of 1600 parts of water and 7.4 parts of concentrated caustic soda to the coupling mass, precipitated by means of sodium chloride, filtered off and dried. It corresponds to the formula

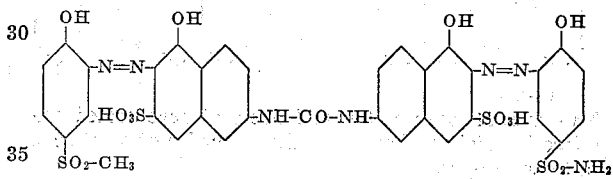

For converting into the copper complex, the separated disazo dyestuff is dissolved at 80–85° in 4800 parts of water and 35.5 parts of 25% ammonia. To this solution is added at the same temperature 54.4 parts of crystallized sodium acetate and, in the course of 30 minutes, a solution of 50 parts of crystallized copper sulfate in 500 parts of water. The coppering mass is agitated for a further 60 minutes at the same temperature, after which time the separated copper complex disazo dyestuff is filtered off and vacuum dried at 90°. It corresponds to the formula

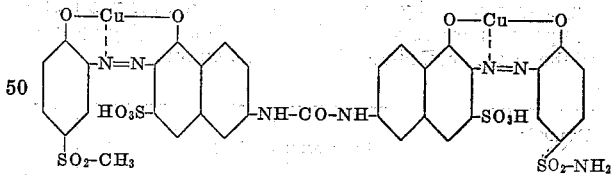

and possesses high affinity for cotton and fibers of regenerated cellulose which it dyes in bright Bordeaux shades of very good fastness to light.

The identical dyestuff is obtained if first the monoazo compound is prepared from 1 mol of diazotized 1-amino-2-hydroxy-5-methylsulfonylbenzene and 1 mol of the symmetrical urea of 2-amino-5-hydroxynaphthalene-7-sulfonic acid and then combined with 1 mol of diazotized 1-amino-2-hydroxybenzene-5-sulfonic acid amide, the resulting disazo dyestuff being subsequently converted into the copper complex compound.

The identical copper-containing dyestuff is also obtained when the diazo compounds named in Example 1 are replaced by 1-amino-2-methoxy-5-methylsulfonylbenzene and 1-amino-2-methoxybenzene-5-sulfonic acid amide; or 1-amino-2-hydroxy-5-methylsulfonylbenzene and 1-amino-2-methoxybenzene-5-sulfonic acid amide; or 1-amino-2-methoxy-5-methylsulfonylbenzene and 1-amino-2-hydroxybenzene-5-sulfonic acid amide; and subjecting the disazo dyestuff thus obtained to the demethylating coppering process.

The method employed for converting into the copper complex must be one whereby splitting of the methoxy group is effected concurrently with metallizing. The following procedure may be noted as an example:

The disazo dyestuff obtained from 20.2 parts of diazotized 1-amino-2-methoxybenzene-5-sulfonic acid amide, 18.7 parts of diazotized 1-amino-2-hydroxy-5-methylsulfonyl-benzene and 54.8 parts of the symmetrical urea of 2-amino-5-hydroxynaphthalene-7-sodium sulfonate is dispersed in the form of an aqueous paste for 1 hour in a solution of 180 parts of sodium chloride in 1400 parts of water at 80–85°. To this suspension is added at the same temperature over a period of 30 minutes a solution of 50 parts of crystallized copper sulfate, 500 parts of water and 64 parts of 25% ammonia; the coppering mass is then heated for 12–16 hours under reflux. After this time demethylating and coppering are completed. The copper-containing disazo dyestuff thus formed possesses the same properties as that described in the second paragraph of this example.

*Example 2*

When the 18.8 parts of 1-amino-2-hydroxybenzene-5-sulfonic acid amide of the foregoing example are replaced by 13.7 parts of 1-amino-2-carboxylic acid, subsequent converting results in a copper-containing disazo dyestuff corresponding to the formula

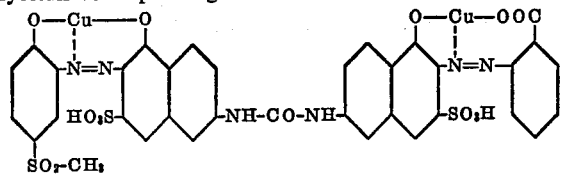

This dyestuff dyes cotton and fibers of regenerated cellulose in bright yellowish Bordeaux shades of very good fastness to light.

In the preceding example a ratio of 1:1 is chosen for the two diazo components. When this ratio is varied equally valuable products are obtained which yield Bordeaux dyeings correspondingly yellower or bluer in hue than those obtained with the dyestuff described in Example 2.

The following table lists other disazo dyestuffs obtained by coupling 1 mol of the symmetrical urea of the 2-amino-5-hydroxynaphthalene-7-sulfonic acid with 1 mol each of the diazo components (I) and (II). The dyestuffs are characterized by the amines from which the two diazo components are derived and by the shades of the dyeings of the copper-containing dyestuffs on cotton.

dyeing the material is left in the bath for 15–20 minutes to cool to 50°, then withdrawn and rinsed and dried.

This method is also employed for dyeing fibers of regenerated cellulose. It is applicable with all the dyestuffs described in the foregoing examples.

In many cases aftertreatment of the dyeing with copper salts, especially when applied in conjunction with cation-active compounds, leads to improved fastness properties.

The formulae of the metal-free disazo dyestuffs of representative members of this invention are as follows:

*Example 3*

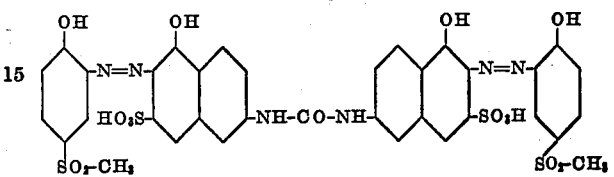

*Example 4*

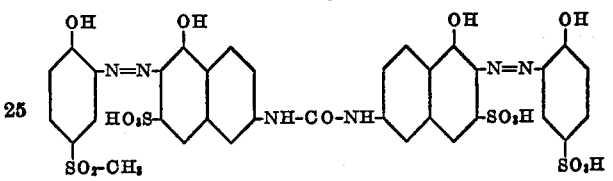

*Example 6*

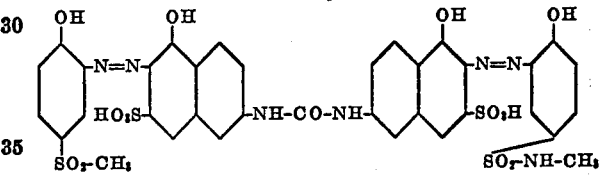

Having thus disclosed the invention, what is claimed is:

1. A copper complex compound of a disazo dyestuff which corresponds to the formula

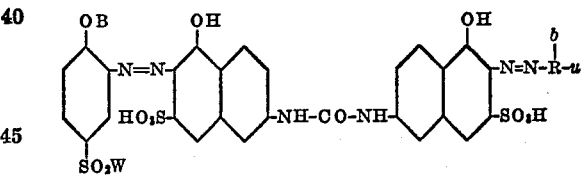

wherein:

$b$ stands for a member selected from the group consisting of a hydroxy, a methoxy and a carboxy group, B stands for a member selected from the group consisting of hydrogen and methyl,

| Example No. | Diazo compound (I) | Diazo compound (II) | Shade of the dyeing of the copper-containing dyestuff on cotton |
|---|---|---|---|
| 3 | 1-amino-2-hydroxy-5-methylsulfonylbenzene | 1-amino-2-hydroxy-5-methylsulfonylbenzene | Bright Bordeaux. |
| 4 | ----do---- | 1-amino-2-hydroxybenzene-5-sulfonic acid | Do. |
| 5 | ----do---- | 1-amino-2-methoxybenzene-5-sulfonic acid | Do. |
| 6 | ----do---- | 1-amino-2-hydroxybenzene-5-sulfonic acid methylamide | Do. |
| 7 | ----do---- | 1-amino-2-hydroxybenzene-5-sulfonic acid phenylamide | Do. |
| 8 | ----do---- | 1-amino-2-hydroxy-3-chlorobenzene-5-sulfonic acid | Do. |
| 9 | 1-amino-2-hydroxy-5-phenylsulfonylbenzene | 1-amino-2-methoxybenzene-5-sulfonic acid | Do. |
| 10 | 1-amino-2-methoxy-5-phenylsulfonylbenzene | ----do---- | Do. |
| 11 | 1-amino-2-hydroxy-5-ethylsulfonylbenzene | 1-amino-2-hydroxybenzene-5-sulfonic acid | Do. |
| 12 | 1-amino-2-hydroxy-5-methylsulfonylbenzene | 1-amino-2-carboxybenzene-4-sulfonic acid amide | Do. |

*Example 13*

10 parts of cotton are wet out in a dyebath at 50° containing 300 parts of soft water. 0.1 parts of the dyestuff of Example 1 in concentrated aqueous solution are added to the bath, which is then heated to the boil in 30 minutes and maintained at the boil for 15 minutes. During the dyeing process 3–4 parts of sodium sulfate in concentrated aqueous solution are added. On completion of R stands for a radical of the benzene series wherein $b$ stands in the ortho-position to the N=N group, W stands for a radical selected from the group consisting of a lower aliphatic hydrocarbon radical and a carbocyclic hydrocarbon radical of the benzene series, $u$ stands for a member selected from the group consisting of a hydrogen atom, a sulfonic acid, a sulfonic acid amide, a sulfonic acid lower alkylamide, a sulfonic acid arylamide, an alkyl- and an arylsulfonyl group.

2. A copper complex compound of a disazo dyestuff which corresponds to the formula

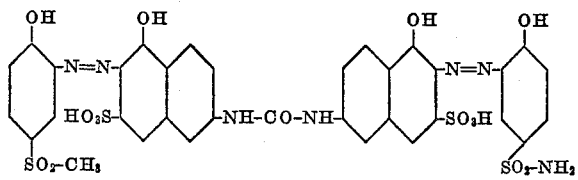

3. A copper complex compound of a disazo dyestuff which corresponds to the formula

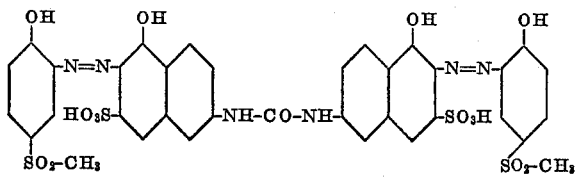

4. A copper complex compound of a disazo dyestuff which corresponds to the formula

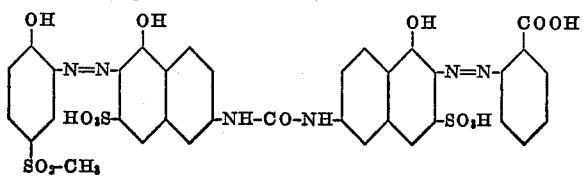

5. A copper complex compound of a disazo dyestuff which corresponds to the formula

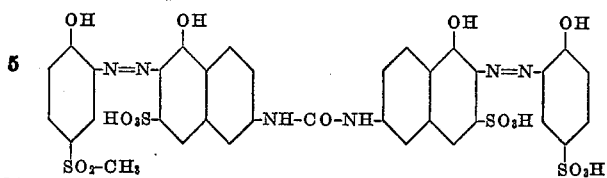

6. A copper complex compound of a disazo dyestuff which corresponds to the formula

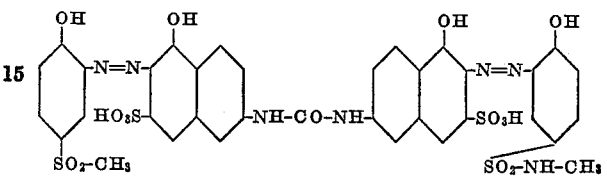

References Cited in the file of this patent

UNITED STATES PATENTS

| | | |
|---|---|---|
| 2,128,255 | Krzikalla et al. | Aug. 30, 1938 |
| 2,538,568 | Kaiser et al. | Jan. 16, 1951 |
| 2,633,462 | Kehrer et al. | Mar. 31, 1953 |